Oct. 29, 1968 T. E. NOAKES ET AL 3,407,665
BOURDON TUBE PRESSURE SENSOR HAVING IMPROVED MOUNTING
Filed July 8, 1966
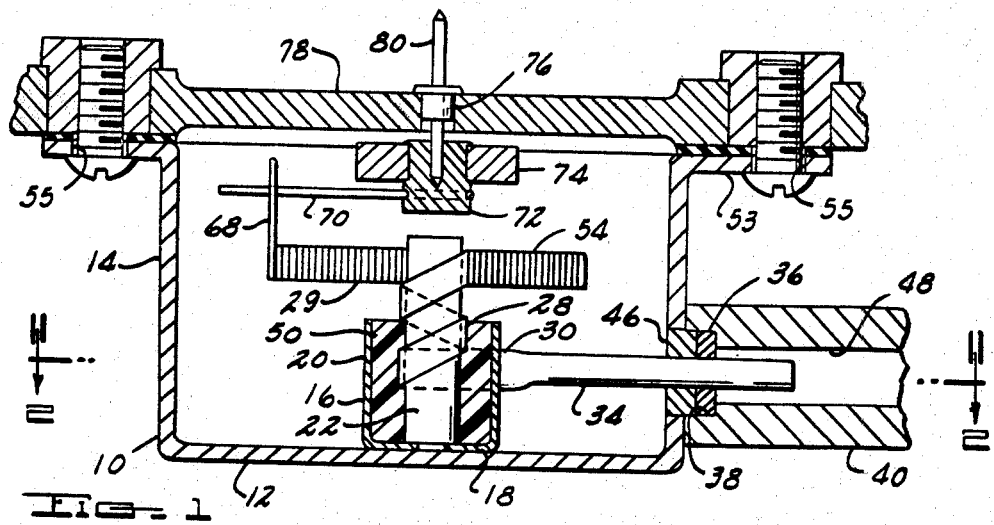
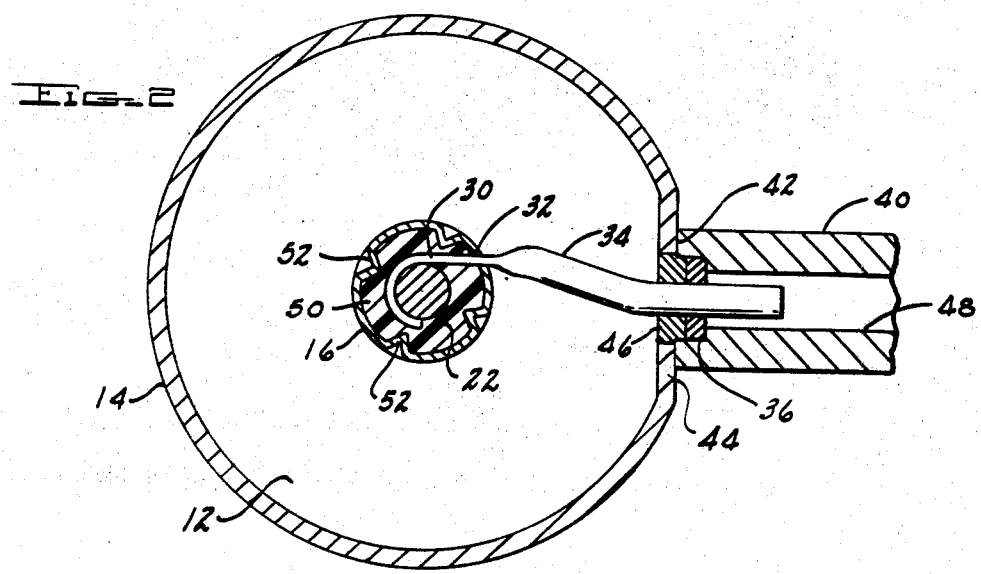
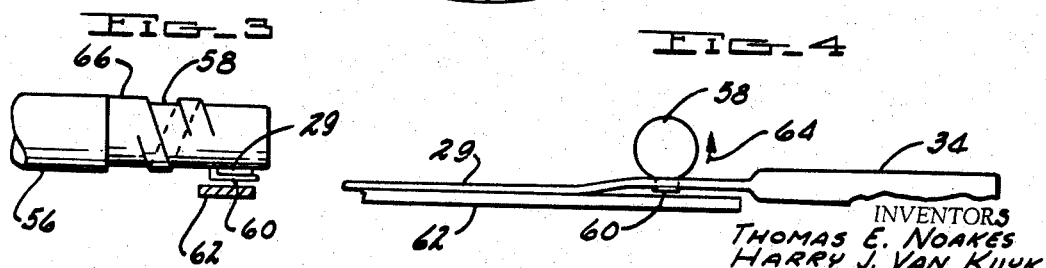
INVENTORS
THOMAS E. NOAKES
HARRY J. VAN KUYK
BY JOHN SOKOLY
TENNES I. ERSTAD
JOHN E. McRAE
ATTORNEYS

United States Patent Office 3,407,665
Patented Oct. 29, 1968

3,407,665
BOURDON TUBE PRESSURE SENSOR HAVING IMPROVED MOUNTING
Thomas Edmund Noakes, Detroit, Harry J. Van Kuyk, Franklin, and John Sokoly, Detroit, Mich., assignors to American Standard Inc., a corporation of Delaware
Filed July 8, 1966, Ser. No. 563,781
7 Claims. (Cl. 73—418)

ABSTRACT OF THE DISCLOSURE

This invention proposes a Bourdon coil pressure responsive instrument wherein the coil is rigidly anchored so that it can wind and unwind without disturbing the anchorage, destroying the seal between the coil and its fluid supply fitting, or otherwise producing strains in the coil as would cause premature fatigue failure. The preferred anchorage comprises a mass of solidified plastic compound and a central coil stabilization post confining a helical section of the coil to produce a strong rigid support for the operating portion of the coil. The coil comprises a tubular lead-in portion which is nonstressed, so that it can be solder sealed to a pressure supply fitting without fear of seal failure.

---

This invention relates to pressure responsive instruments of the Bourdon coil type.

One object on the invention is to provide a pressure responsive instrument where the Bourdon coil is rigidly anchored so that it can wind and unwind without disturbing the anchorage.

Another object is to provide an instrument where in the Bourdon tube may be sealed to the supply fitting with a single solder joint.

A further object is to provide an instrument wherein the Bourbon tube is formed without strains therein which could cause tube failure during service.

In the drawings:

FIG. 1 is a sectional view of one embodiment of the invention taken on line 1—1 in FIG. 2.

FIG. 2 is a sectional view taken on line 2—2 in FIG. 1.

FIG. 3 is a side elevational view of a winding apparatus used to form a Bourbon tube used in the FIG. 1 instrument.

FIG. 4 is a right end view of the FIG. 3 apparatus.

The Bourbon tube mounting

In the drawings there is shown a pressure responsive instrument comprising a cup-like housing or support structure 10 having a back wall 12 and an annular side wall 14. Centrally disposed within the housing is a small cup-like container 16 having a bottom wall 18 and an upstanding annular side wall 20. Fixedly disposed within container 16 is a cylindrical post 22 having its lower reduced end portion adhered to wall 12 by spot welding, thus clamping container 16 in place. Surrounding post 22 is a helical tube portion 28 forming part of a Bourdon tube 29. As shown in FIG. 2, helical portion 28 connects with a flattered tangential tube portion 30 which proceeds through a slot 32 in the cup side wall 20. The lead-in tube portion 34 outside container 16 is of circular cross section and has a washer 36 carried thereon as a semiloose fit.

Washer 36 fits semiloosely in a circular cavity 38 formed in a hollow pressure supply fitting 40 which is welded at 42 onto the flattened portion 44 of the housing side wall 14. The joint between tube portion 34 and supply fitting 40 may be sealed by a ring of solder 46. Washer 36 is useful during the soldering operation in that it prevents the liquid solder from flowing into passage 48.

Referring again to the helical tube portion 28, said portion is shown surrounded by or embedded in a mass of fused solidified plastic potting compound 50, which may for example be epoxy. The epoxy is introduced into container 16 as a thick semiliquid mass prior to installation of the Bourdon tube 29. After the Bourdon tube has been manipulated to its illustrated position the epoxy is allowed to harden to thus rigidly anchor the helical portion 28 in place. Thereafter a ring of solder is applied at 46 to seal the joint between tube portion 34 and housing wall 14. Indentations 52 in the upper portion of the container 16 side wall serve to mechanically lock the solidified epoxy in the container.

During the setting or curing period for the epoxy the Bourdon coil must be temporarily supported in its desired attitude without stress; otherwise the spiral and helical portions of the coil may assume slightly tilted or nonconcentric conditions after the epoxy has hardened. Preferably the coil is temporarily supported with its spiral portion 54 clamped to the underside of a support fixture (not shown) which seats on the upper face of housing flange 53. During the curing period tube portion 34 projects into passage 48, and washer 36 is retained on tube portion 34 leftwardly of counterbore 38; the support fixture thus is able to hold the Bourdon coil in a centered, nontilted, stress-free position during the period required to harden the epoxy. After the epoxy has solidified the fixture may be unclamped from the coil, and the washer slid rightwardly into counterbore 38 preparatory to the soldering operation.

As shown in FIG. 1, the plastic mounting block 50 is formed and confined in a container 16. It will be seen however that the container could be eliminated, as by molding block 50 around a prepositioned Bourdon coil. The injection mold would in that event contain a mold cavity shaped in accordance with the desired external contour of the plastic mounting block.

Bourdon tube forming

The complete Bourdon tube 29 comprises a circular cross section lead-in portion 34, a flattened tangential portion 32, flattened helical portion 29, and a multiconvolution spiral portion 54. Preferably the entire tube is formed from a single length of initially round tubing. The initial forming operation involves a flattening operation on the tube portions going to make up portions 30, 28 and 54; this may be accomplished between spaced feed rolls (not shown). The actual winding or coiling operation may be accomplished with the apparatus schematically shown in FIGS. 3 and 4.

The illustrated apparatus includes a spindle portion 56 adapted to be chucked in a conventional lathe, and a helically grooved mandrel portion 58 having a hook-shaped retainer device 60 for holding the flattened portion of the work piece against the mandrel surface. A pressure or ironing element 62 may be mounted beneath the mandrel portion to effect a coiling action on tube 29 as the mandrel is turned about its axis by the lathe. Element 62 is preferably mounted on the piston of a fluid cylinder (not shown) so that element 62 moves upwardly into engagement with tube 29 as the mandrel begins rotating. Additionally, the support for element 62 may be drivingly engaged with the screw feed of the lathe so that element 62 moves leftwardly as the mandrel rotates, thus enabling element 62 to maintain an ironing position on the Bourdon tube material during the step of winding helix portion 28.

Assuming the tube is mounted in the grip of retaining device 60, the lathe is operated to turn mandrel 58 in the arrow 64 direction. Simultaneously presser element 62 moves upwardly and then leftwardly to engage the tube 29 outer surface. The tube is wound onto the mandrel surface and follows the helical groove to form helix portion 28; during this time presser element 62 moves leftwardly keeping pace with the leftward displacement of the tube 29 material. After approximately one and three quarters revolutions of the mandrel presser element 62 is disengaged from its leftward feed drive (as by a limit switch) and the tube is allowed to wind on itself about surface 66 to form spiral portion 54. After the coil winding operation the free flattened end of the coil may be sealed, as by welding or brazing.

Uses of the Bourdon tube

The illustrated Bourdon tube assembly may be used in a magnetically driven gage similar to that shown in U.S. Patent 3,177,722. Thus, the Bourbon tube may be provided with an upstanding actuator arm in the form of a wire loop 68, said loop being adapted to encircle a wire follower arm 70 radiating from a hub 72 which carries a permanent magnet 74. As shown, the hub is rotatably mounted on one end of a one piece pin 76 projecting through wall 78 of the primary gage housing. A second pointer-equipped magnet (not shown) may be rotatably mounted on the upper end portion 80 of the pin to move in unison with magnet 74. The entire arrangement is shown and described in the above mentioned U.S. Patent 3,177,722.

It will be understood that the Bourdon tube assembly may be used in gages constructed differently than that of U.S. Patent 3,177,722. For example, the gage pointer may be affixed directly to the Bourdon tube as in U.S. Patent 3,213,688. Alternately a hub-wire arm drive may be used as in copending U.S. Patent application, Serial No. 218,957, filed Aug. 23, 1962, now Patent 3,277,722. The Bourdon tube may be used to drive devices other than than pointers, as for example pens, electrical wiper arms, or switch arms.

Features of the invention

One feature of the present invention is the rigidity of the Bourdon tube anchorage provided by the contained mass of epoxy potting compound 50. Additional rigidity is contributed by the cylindrical post 22 which under certain conditions engages the inner surface of helix 28 to preclude lateral displacement of the helix upper portion. Post 22 comes into play principally under high shock periods. During such periods the coil surface may engage the post surface without deformation to the shock. During normal periods the coil is free from the post. Preferably the epoxy anchoring material engages a considerable length of the coil, as for example about one complete turn, to provide an extensive support surface for the coil.

It will be noted that the rotational axis and plane of the Bourdon spiral 29 are determined by the position taken when helical portion 28 is initially imersed in the plastic. The plane of spiral 29 may be accurately established with reference to the plane formed by the upper surface of housing flange 53, as through the use of the aforementioned clamping fixture. Preferably the fixture has pins which can seat in mounting holes 55 while the epoxy is curing; these pins accurately establish the rotational axis of the spiral 29. The axis may or may not precisely coincide with the axis of post 22.

In some cases the gage may be used with spiral 29 occupying a vertical plane, in which event the gravitational effect may cause the spiral to droop. In such cases the final rotational axis will not coincide with that originally established during the potting operation. A repositionment of housing 10 along wall 78 may then be necessary. For this purpose holes 55 may be oversize or new holes may be drilled in addition to the existing holes.

Of some interest is the fact that tube portion 28 which takes the mounting force is separate from portion 34 which seals the Bourdon tube to the supply fitting. Sealing portion 34 is thus free of such mechanical stress as might prematurely destroy the seal.

The Bourdon tube is further relieved of stress due to its configuration. Thus, the only portions having appreciable built-in stress are the flattened portions 32, 28 and 54; the stress is due to flattening and coiling. Stresses occurring during the flattening may be controlled by the use of internal mandrels, such as flat ribbons, fusible materials, etc. Stresses occurring during the coiling operation are not appreciable because they are primarily radial bending stresses which can be readily handled by the flat tube material. It will be noted that round tube portion 34 has only a very slight bend therein. Previous designs have employed a right angle bend in a round tube portion; such extreme bends have tended to produce tube failure, especially under vibrational conditions and where the bent portion was also the mounting portion for the coil. In the present design the round cross sectioned portion of the tube has no extreme bend; additionally the round portion is merely a sealing portion and not the mounting or support portion for the coil.

It will be noted that passage 48 has a considerably larger diameter than tube portion 34. This enables tubes of varying diameter and wall thickness to be mounted in a common housing-fitting assembly. For example the tube diameter may be .040 inch or .060 inch or .080 inch or .120 inch, and the tube may in each case be accommodated in a housing-fitting assembly having a passage 48 diameter of .19 inch. The inner diameter of washer 36 must of course be varied to accept the different diameter tubes. By thus using the oversize passage-undersize tube relationship it is possible to build a range of pressure instruments in which the only variables are the Bourdon tube and washer 36. This may considerably reduce parts inventory costs and production equipment.

The novel features of the invention are set forth in the appended claims.

It is claimed:
1. A pressure responsive instrument comprising a rigid support structure; a one piece Bourdon coil comprising a helical mounting portion, a multiconvolution spiral operating portion radiating outwardly from one end of the helical mounting portion, and a tubular fluid supply lead-in portion extending from the other end of the helical mounting portion; and means rigidly anchoring the helical mounting portion on the support structure; said anchoring means comprising a mass of solidified fused material surrounding and confining the helical mounting portion so that it is prevented from movement relative to the support structure.

2. The instrument of claim 1 wherein the fused solidified material is confined within a container carried by the support structure.

3. The instrument of claim 1 wherein the solidified fused material engages and surrounds at least one complete turn of the helical mounting portion.

4. The instrument of claim 1 and further comprising a hollow pressure supply fitting rigidly affixed to the support structure at a point remote from the helical mounting portion of the coil; said tubular lead-in portion of the coil extending into the fitting to receive fluid therefrom; and means sealing the joint between the fitting and lead-in portion; said fitting defining an elongated relatively small diameter passage and a shortened relatively large diameter cavity; the aforementioned lead-in portion of the coil extending through the cavity into the passage; the sealing means comprising solidified sealant material lodged in the cavity in surrounding relation to the coil lead-in portion.

5. The instrument of claim 4 and further comprising a washer carried by the coil lead-in portion and seated in the cavity to retard the flow of sealant material into the passage.

6. The instrument of claim 1 wherein the solidified fused material consists of solidified plastic potting compound arranged so that the coil helical mounting portion is embedded therein.

7. A pressure responsive instrument comprising a rigid support structure; a one piece Bourdon coil comprising a helical mounting portion, a multiconvolution spiral operating portion radiating outwardly from one end of the helical mounting portion, and a tubular fluid supply lead-in portion extending from the other end of the helical mounting portion; means rigidly anchoring the helical mounting portion on the support structure; and a stationary coil stabilization post rigid with the support structure, said post extending axially and centrally through the helical mounting portion and spiral operating portion, said post having its side surface lying adjacent the inner surface of the helical coil portion to stabilize the coil against radial vibrations.

References Cited

UNITED STATES PATENTS

| | | | |
|---|---|---|---|
| 1,385,133 | 7/1921 | Ibbott | 73—411 |
| 3,177,722 | 4/1965 | Huston | 73—416 |
| 3,213,688 | 10/1963 | Huston | 73—411 |
| 3,277,722 | 10/1966 | Huston | 73—418 |

S. CLEMENT SWISHER, *Acting Primary Examiner.*

D. E. CORR, *Assistant Examiner.*